US012719170B2

(12) United States Patent
Peters

(10) Patent No.: US 12,719,170 B2
(45) Date of Patent: Aug. 25, 2026

(54) FOLDED COLLINEAR DIPOLE ANTENNA

(71) Applicant: Mark Peters, Jeffersonville, IN (US)

(72) Inventor: Mark Peters, Jeffersonville, IN (US)

( * ) Notice: Subject to any disclaimer, the term of this patent is extended or adjusted under 35 U.S.C. 154(b) by 0 days.

(21) Appl. No.: 18/674,773

(22) Filed: May 24, 2024

(65) Prior Publication Data

US 2024/0322438 A1 Sep. 26, 2024

Related U.S. Application Data

(60) Provisional application No. 63/577,026, filed on Mar. 24, 2023.

(51) Int. Cl.
*H01Q 9/26* (2006.01)
*H01Q 9/08* (2006.01)

(52) U.S. Cl.
CPC ................. *H01Q 9/26* (2013.01); *H01Q 9/08* (2013.01)

(58) Field of Classification Search
CPC .. H01Q 9/26; H01Q 9/08; H01Q 5/25; H01Q 5/321; H01Q 21/10
See application file for complete search history.

(56) References Cited

U.S. PATENT DOCUMENTS 3,159,838 A * 12/1964 Facchine .................. H01Q 9/28 343/792
4,178,576 A * 12/1979 Schmidt, Jr. ......... H01Q 19/134 343/781 R
4,369,449 A * 1/1983 MacDougall ............ H01Q 9/16 343/792
4,658,260 A * 4/1987 Myer ....................... H01Q 5/40 343/903
5,089,829 A * 2/1992 Haruyama ............. H01Q 5/321 343/903
5,213,522 A * 5/1993 Kojima .............. H01R 13/7195 333/185
5,568,161 A * 10/1996 Fulmer, Sr. ............ H01Q 21/10 343/810
6,057,804 A * 5/2000 Kaegebein ............... H01Q 9/32 343/792

(Continued)

*Primary Examiner* — Dameon E Levi
*Assistant Examiner* — Jordan E. DeWitt
(74) *Attorney, Agent, or Firm* — Duncan Galloway Greenwald PLLC; Kevin T. Duncan

(57) ABSTRACT

A new and improved Folded Collinear Dipole (FCD) Antenna eliminates a coaxial feed and provides a folded ½ wave top element that is basically two ½ wave elements in parallel above a ⅕th wave coil isolator another ¼ wave element that is on top of another ¼ wave element that is shielded by a brass feed tube and the bottom element is insulated with a PTFE tube. This is all stacked on top of an RF 50-ohm fitting (Typically an "N" female). A cover/protection tube "G" is made from "cross-linked polyethylene" tubing to increase performance of this antenna as it is nearly invisible to the RF signal and does not attenuate the signal which would reduce overall performance found today in most sleeved monopole antennas. The Vinyl cap protectors are used for mainly two functions, on the main larger sleeve it keeps out any atmospheric conditions including intruders such as insects. The feed tube cap insulates and keeps the element centered into the feed tube assembly.

5 Claims, 24 Drawing Sheets

(56) References Cited

U.S. PATENT DOCUMENTS

| | | | | | |
|---|---|---|---|---|---|
| 6,177,911 | B1 * | 1/2001 | Yuda | H01Q 9/145 343/792 |
| 6,421,030 | B1 * | 7/2002 | Oglesby | H01Q 9/16 343/702 |
| 6,549,175 | B1 * | 4/2003 | Cencich | H01Q 21/0006 343/863 |
| 6,552,692 | B1 * | 4/2003 | Zeilinger | H01Q 9/16 343/792 |
| 6,608,597 | B1 * | 8/2003 | Hadzoglou | H01Q 5/321 343/715 |
| 6,720,934 | B1 * | 4/2004 | Price | H01Q 21/0006 343/792 |
| 7,057,577 | B1 * | 6/2006 | Willoughby | H01Q 1/002 343/905 |
| 7,116,281 | B2 * | 10/2006 | Rankin | H01Q 9/20 343/893 |
| 8,922,445 | B2 * | 12/2014 | Ngo Bui Hung | H01Q 1/52 343/792 |
| 2004/0056817 | A1 * | 3/2004 | Tsai | H01Q 9/16 343/792 |
| 2010/0283699 | A1 * | 11/2010 | Apostolos | H01Q 5/378 343/792 |
| 2014/0151028 | A1 * | 6/2014 | Parsche | E21B 43/2401 166/57 |
| 2014/0296839 | A1 * | 10/2014 | Brannan | A61B 18/1815 606/33 |
| 2015/0244075 | A1 * | 8/2015 | Platt | H01Q 1/38 343/792 |
| 2019/0173190 | A1 * | 6/2019 | Johnson | H01Q 13/24 |
| 2024/0322438 | A1 * | 9/2024 | Peters | H01Q 21/10 |

* cited by examiner

400

410

FCD Radiation Pattern

3-D Radiation Pattern of a FCD

Radiation and distance vs. Gain

Dipole Vs. FCD Antennas

The standard Dipole antenna has a very narrow band width so in frequency hopping you will get much less efficiency as compared to the FCD.

440

450

Radiation Patterns of FCD vs Dipole

FCD

460

Dipole

470

FCD Efficiency measured at 100 meters
with data capture.

Antenna Lengths Straight and Angled

| Type/Frequency | Overall Length * Note 1 | Overall Length * Note 1 |
|---|---|---|
| | Straight | Angled |
| FCD 5.0GHZ | 4.75″ | 4.50″ |
| FCD 2.4GHz | 7.50″ | 7.25″ |
| FCD 900MHz | 17.25″ | 17.00″ |
| DP 5.0GHZ | 3.00″ | 2.75″ |
| DP 2.4GHz | 4.50″ | 4.25″ |
| DP 900MHz | 7.50″ | 7.25″ |
| CDP 5.0GHZ | 4.75″ | 4.50″ |
| CDP 2.4GHz | 7.50″ | 7.25″ |
| CDP 900MHz | 17.25″ | 17.00″ |
| | | |

Note 1 – Due to manufacturing of parts and availability dimensions could vary slightly.

Note 2 – Antenna Diameter is 0.75″

600

Antenna Lengths Straight and Angled

| Type/Frequency | Overall Length * Note 1 | Overall Length * Note 1 |
|---|---|---|
| | Straight | Angled |
| FCD 5.0GHZ | 4.75″ | 4.50″ |
| FCD 2.4GHz | 7.50″ | 7.25″ |
| FCD 900MHz | 17.25″ | 17.00″ |
| DP 5.0GHZ | 3.00″ | 2.75″ |
| DP 2.4GHz | 4.50″ | 4.25″ |
| DP 900MHz | 7.50″ | 7.25″ |
| CDP 5.0GHZ | 4.75″ | 4.50″ |
| CDP 2.4GHz | 7.50″ | 7.25″ |
| CDP 900MHz | 17.25″ | 17.00″ |
| | | |

Note 1 – Due to manufacturing of parts and availability dimensions could vary slightly.

Note 2 – Antenna Diameter is 0.75″

700

Brass antenna shield tubing Length in inches (8.5mm with .22 wall)

| Antenna Type | Dimension "A" |
|---|---|
| | |
| FCD 5.0GHZ | 0.95" |
| FCD 2.4GHz | 1.50" |
| FCD 900MHz | 2.90" |
| DP 5.0GHZ | 0.55" |
| DP 2.4GHz | 1.10" |
| DP 900MHz | 2.62" |
| CDP 5.0GHZ | 0.95" |
| CDP 2.4GHz | 1.50" |
| CDP 900MHz | 2.90" |

1000

Large Cell Foam
Insulation tubing
Length in inches

| Antenna Type | Dimension "A" |
|---|---|
| | |
| FCD 5.0GHZ | None |
| FCD 2.4GHz | None |
| FCD 900MHz | 1.00" |
| DP 5.0GHZ | None |
| DP 2.4GHz | None |
| DP 900MHz | None |
| CDP 5.0GHZ | None |
| CDP 2.4GHz | None |
| CDP 900MHz | 0.50" |

PTFA Heat Seal
Length in inches

Note: This is a PTFE shrinkable sleeve that covers the Part number sticker. It also has a marine grade adhesive that will seal the main tube/sleeve around the RF fitting

| Antenna Type | Dimension “A” |
|---|---|
| | |
| FCD 5.0GHZ | 1.00” |
| FCD 2.4GHz | 1.00” |
| FCD 900MHz | 1.00” |
| DP 5.0GHZ | 1.00” |
| DP 2.4GHz | 1.00” |
| DP 900MHz | 1.00” |
| CDP 5.0GHZ | 1.00” |
| CDP 2.4GHz | 1.00” |
| CDP 900MHz | 1.00” |

1200

PTFE antenna Insulation tubing Length in inches (6mm OD X 4mm ID)

| Antenna Type | Dimension "A" |
|---|---|
| | |
| FCD 5.0GHZ | 1.35" |
| FCD 2.4GHz | 1.90" |
| FCD 900MHz | 3.28" |
| DP 5.0GHZ | 0.95" |
| DP 2.4GHz | 1.50" |
| DP 900MHz | 3.00" |
| CDP 5.0GHZ | 1.35" |
| CDP 2.4GHz | 1.90" |
| CDP 900MHz | 3.28" |

1300

FIG. 13

Antenna sheath tubing
Length in inches

| Antenna Frequency | Length "A" |
|---|---|
| | |
| FCD 5.0GHZ | 3.75" |
| FCD 2.4GHz | 6.50" |
| FCD 900MHz | 16.25" |
| DP 5.0GHZ | 2.00" |
| DP 2.4GHz | 3.50" |
| DP 900MHz | 6.50" |
| CDP 5.0GHZ | 3.75" |
| CDP 2.4GHz | 6.50" |
| CDP 900MHz | 16.25" |

1400

Advanced Antenna Solutions
3000 Crystal Springs Blvd.
Jeffersonville, Indiana 47230
www.genus-llc.com
mark.peters@genus-llc.com Collinear Dipole
High Performance Antenna
Dipole 4.5-DBi

50 Ohm Collinear Dipole Antenna

The AAS high performance "Dipole Antenna is from a legend in antenna technology. This antenna has an increase in band width of over 300% as compared to any Mono antenna. With a standard gain of nearly 5 dBi it can reach and secure data to distances never accomplished by standard dipole antennas. The exterior of the antenna is constructed of an environmentally stable and RF invisible HDPE. This material is UV resistant, weather proof and has a resistant to many chemicals. Built tough for the harshest environments!

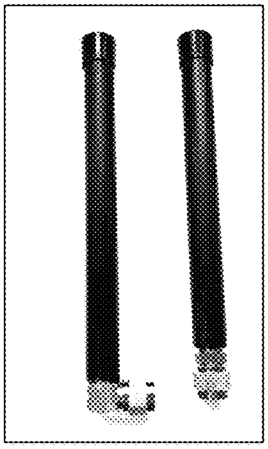

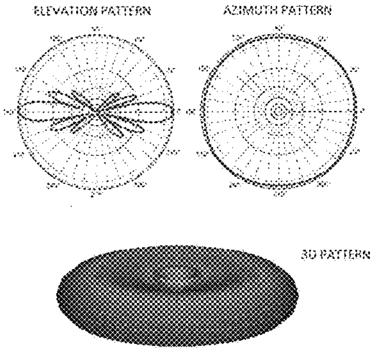

Radiation
Patterns

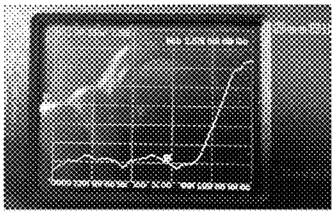

VSWR

Band Width: From 2.1GHz to 2.70 GHz
VSWR: Over the Band Width < 1.2:1
Impedance: 50 Ohms

| Antenna Description | Part Number | Dimensions |
|---|---|---|
| 2.4GHz Straight N male Brass/Nickle connector | DP-NF-S-2.4G-NB-* | 4-3/8" Long x ¾" Diameter |
| 2.4GHz 90 Degree N male Brass/Nickle connector | DP-NF-A-2.4G-NB-* | 4-3/8" Long x ¾" Diameter |
| 2.4GHz Straight N male SST connector | DP-NF-S-2.4G-SS-* | 4-3/8" Long x ¾" Diameter |
| 2.4GHz 90 Degree N male SST connector | DP-NF-A-2.4G-SS-* | 4-3/8" Long x ¾" Diameter |

*- Batch Code (Week/Year)

1500

FIG. 15

Advanced Antenna Solutions
3000 Crystal Springs Blvd.
Jeffersonville, Indiana 47230
www.genus-llc.com
mark.peters@genus-llc.com Folded Collinear Dipole
High Performance Antenna
FCD 9-DBi
2.4GHz

50 Ohm Folded Collinear Dipole Antenna

The AAS high performance Folded Collinear Dipole Antenna *(Patent Pending)* is a breakthrough in antenna technology. This antenna has an increase in band width of over 500% as compared to any Mono/Dipole antenna. With a standard gain of over 9 dBi it can reach and secure data to distances never accomplished by standard dipole antennas. The exterior of the antenna is constructed of an environmentally stable and RF invisible HDPE. This material is UV resistant, weather proof and has a resistant to many chemicals. Built tough for the harshest environments!

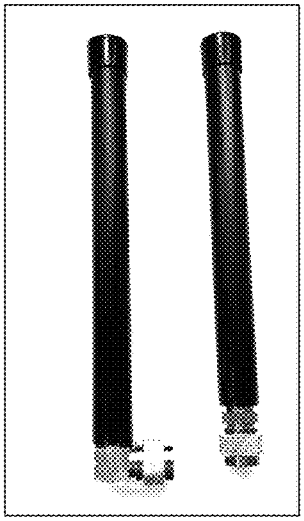

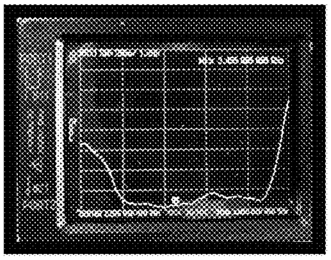

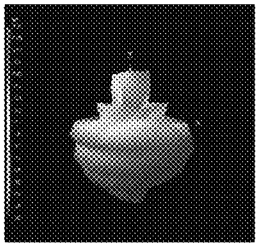

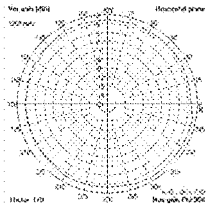

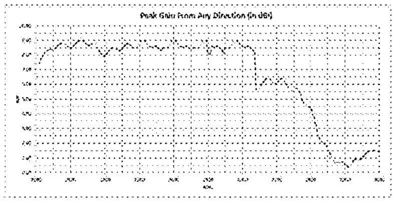

Band Width: From 2.18GHz to 2.85GHz
VSWR: Over the Band Width < 1.2:1
Impedance: 50 Ohms

| Antenna Description | Part Number | Dimensions |
|---|---|---|
| 2.4GHz Straight N male Brass/Nickle connector | FCD-NFS-2G-NB-* | 7-1/8" Long x ¾" Diameter |
| 2.4GHz 90 Degree N male Brass/Nickle connector | FCD-NFA-2G-NB-* | 7-1/8" Long x ¾" Diameter |
| 2.4GHz Straight N male SST connector | FCD-NFS-2G-SS-* | 7-1/8" Long x ¾" Diameter |
| 2.4GHz 90 Degree N male SST connector | FCD-NFA-2G-SS-* | 7-1/8" Long x ¾" Diameter |

*-Batch Code (Week/Year)

1600

FIG. 16

AAS

Advanced Antenna Solutions
3000 Crystal Springs Blvd.
Jeffersonville, Indiana 47230
www.genus-llc.com
mark.peters@genus-llc.com Folded Collinear Dipole
High Performance Antenna
FCD 9-DBi
915 MHz

50 Ohm Folded Collinear Dipole Antenna

The AAS high performance Folded Collinear Dipole Antenna *(Patent Pending)* is a breakthrough in antenna technology. This antenna has an increase in band width of over 500% as compared to any Mono/Dipole antenna. With a standard gain of over 9 dBi it can reach and secure data to distances never accomplished by standard dipole antennas. The exterior of the antenna is constructed of an environmentally stable and RF invisible HDPE. This material is UV resistant, weather proof and has a resistant to many chemicals. Built tough for the harshest environments!

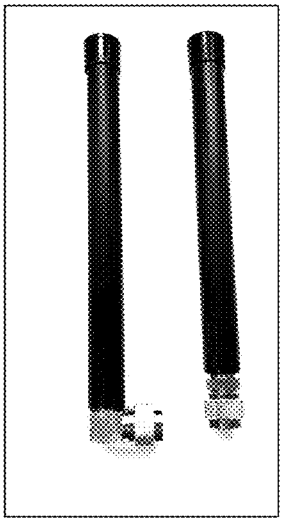

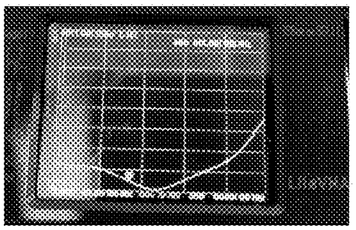

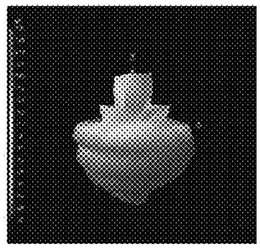

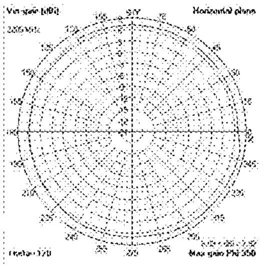

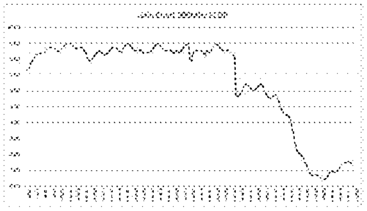

Band Width: From 885MHz to 9.75MHz
VSWR: Over the Band Width < 1.2:1
Impedance: 50 Ohms

| Antenna Description | Part Number | Dimensions |
|---|---|---|
| 900MHz Straight N male Brass/Nickle connector | JCD-NFS-9M-NB-* | 17-3/8" Long x ¾" Diameter |
| 900MHz 90 Degree N male Brass/Nickle connector | JCD-NFA-9M-NB-* | 17-3/8" Long x ¾" Diameter |
| 900MHz Straight N male SST connector | JCD-NFS-9M-SS-* | 17-3/8" Long x ¾" Diameter |
| 900MHz 90 Degree N male SST connector | JCD-NFA-9M-SS-* | 17-3/8" Long x ¾" Diameter |

*-Batch Code (week/Year)

1700

FIG. 17

AAS
Advanced Antenna Solutions
3000 Crystal Springs Blvd.
Jeffersonville, Indiana 47230
www.genus-llc.com
mark.peters@genus-llc.com Folded Collinear Dipole
High Performance Antenna
FCD 5-DBi 5GHz

50 Ohm Folded Collinear Dipole Antenna

The AAS high performance "Folded Collinear Dipole Antenna is legend in antenna technology. This antenna has an increase in band width of over 300% as compared to any Mono/Dipole antenna. With a standard gain of over 5 dBi, it can reach and secure data to distances never accomplished by standard dipole antennas. The exterior of the antenna is constructed of an environmentally stable and RF invisible HDPE. This material is UV resistant, weather proof and has a resistant to many chemicals. Built tough for the harshest environments!

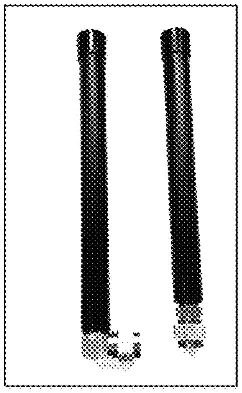

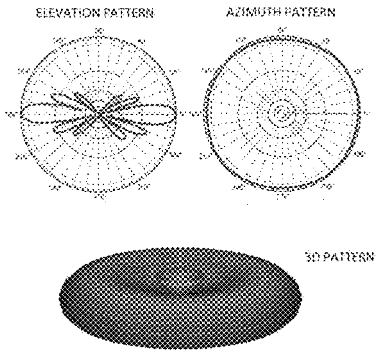

Radiation
Patterns

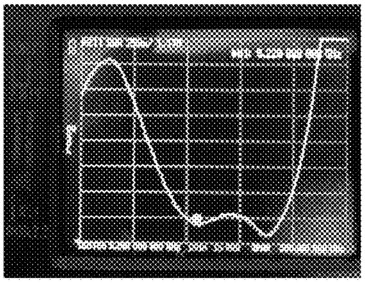

VSWR

Horizontal
Gain
Pattern

Band Width: From 5.1GHz to 5.4GHz
VSWR: Over the Band Width < 1.2:1
Impedance: 50 Ohms

| Antenna Description | Part Number | Dimensions |
|---|---|---|
| 5.0GHz Straight N male Brass/Nickle connector | FCD-NFS-5G-NB-* | 4-1/2" Long x ¾" Diameter |
| 5.0GHz 90 Degree N male Brass/Nickle connector | FCD-NFA-5G-NB-* | 4-1/2" Long x ¾" Diameter |
| 5.0GHz Straight N male SST connector | FCD-NFS-5G-SS-* | 4-1/2" Long x ¾" Diameter |
| 5.0GHz 90 Degree N male SST connector | FCD-NFA-5G-SS-* | 4-1/2" Long x ¾" Diameter |

*-Batch Code (week/year)

1800

FIG. 18

Advanced Antenna Solutions
3000 Crystal Springs Blvd.
Jeffersonville, Indiana 47230
www.genus-llc.com
mark.peters@genus-llc.com Collinear Dipole
High Performance Antenna
Dipole 4.5-DBi
915MHz

50 Ohm Collinear Dipole Antenna

The AAS high performance "Dipole Antenna is from a legend in antenna technology. This antenna has an increase in band width of over 300% as compared to any Mono antenna. With a standard gain of nearly 5 dBi it can reach and secure data to distances never accomplished by standard dipole antennas. The exterior of the antenna is constructed of an environmentally stable and RF invisible HDPE. This material is UV resistant, weather proof and has a resistant to many chemicals. Built tough for the harshest environments!

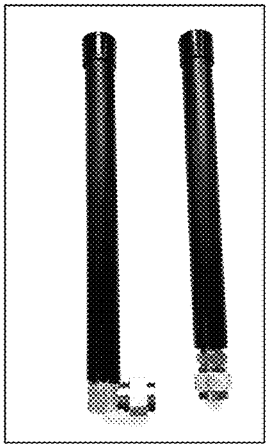

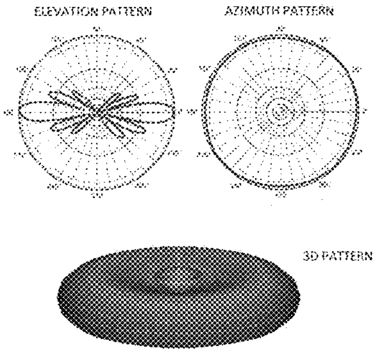

Radiation Patterns

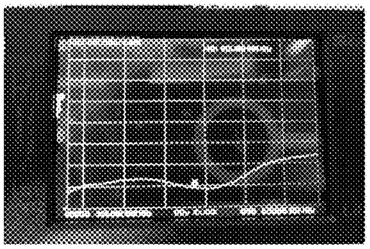

VSWR

Band Width: From 852MHz to 978 MHz
VSWR: Over the Band Width < 1.2:1
Impedance: 50 Ohms

| Antenna Description | Part Number | Dimensions |
|---|---|---|
| 915MHz Straight N male Brass/Nickle connector | DP-NF-S-900M-NB-* | 7-3/8" Long x ¾" Diameter |
| 915Hz 90 Degree N male Brass/Nickle connector | DP-NF-A-900M-NB-* | 7-3/8" Long x ¾" Diameter |
| 915MHz Straight N male SST connector | DP-NF-S-900M-SS-* | 7-3/8" Long x ¾" Diameter |
| 915MHz 90 Degree N male SST connector | DP-NF-A-900M-SS-* | 7-3/8" Long x ¾" Diameter |

*- Batch Code (Week/Year)

FIG. 19

1900

| Folded Colinear Dipole | Input Frequency | Length Inches | | Length Metric cM |
|---|---|---|---|---|
| | 2450 | | | |
| Section "A" | | 2.72 | | 6.91 |
| Section "B" | | 2.72 | | 6.91 |
| Section "C" | | 0.55 | | 1.41 |
| Coil "C" (Wire Length) | | 2.18 | | 5.53 |
| Radiators Width "D" | | 0.19 | | 0.49 |
| Section "E" | 0.380" is in the "N" RF Fitting | 2.56 | | 6.51 |
| Section "F" | Length + 0.360 | 1.13 | Note 1 | 2.87 |
| Section "F" total cut length | Press into N fitting | 1.51 | | 3.84 |
| Total Length of Wire | | 10.18 | Note 2 | 25.86 |
| Total Antenna Height 1 Coils 9dBi | Add .125 for insertion | 5.96 | | 15.15 |
| Diameter of Coil | | 0.225 | | 0.57 |
| Insulator tube length | | 1.512 | | 3.84 |
| No. of Coils calculator | | | 3.08 | |
| Wave length | | 4.82 | | 12.23 |
| Velocity factor | | 1 | | 1 |
| Corrected Wave length | | 4.82 | | 12.23 |
| External Tube Length | | 6.5 | | 16.4 |

Note 1: Brass Tube light guage 8.5mm OD 7.55mm ID
Note 2: Cut wire to 30" (76.2 cM) Then trim in to exact demensions Exemplary configuration of the Antenna of Figure 2A

2000

FIG. 20

FOLDED COLLINEAR DIPOLE ANTENNA

CROSS-REFERENCE TO RELATED APPLICATIONS

The present invention claims the benefit of priority to U.S. Pat. App. No. 63/577,026 filed Mar. 24, 2023 (GNP-032123-01), entitled FOLDED COLLINEAR DIPOLE ANTENNA (Peters), which is incorporated by reference herein in its entirety.

FIELD OF INVENTION

The present invention generally relates to the field of providing intrinsically safe equipment for use in hazardous locations. More particularly the present invention relates to barriers for use in transmitting intrinsically safe sensor, control, digital and analog signals into hazardous areas, such as for use through the wall of a safe area rated for Division 2/Zone 2 area enclosure.

BACKGROUND

Different types of antennas are used in radio and telecommunications, typically for both transmitting and receiving signals generated by a transmitter. In radio transmission, antennas serve as the interface between radio waves introduced and propagated through a medium, such as air, e.g., radio broadcast. Electrical currents flowing in conductors associated with antennas are used most commonly with transmitters/receivers/transceivers. The transmitter supplies an electric current to the antenna's terminals to transmit an electrical signal. The antenna radiates energy from the current as electromagnetic waves, referred to as radio waves. Power of the electromagnetic wave produces an electric current at the antenna's terminals, and is applied to a receiver. The receiver amplifies and further processes the received signal for further use, e.g., in producing sound waves. An antenna may be in the form of an array of conductors. See https://en.wikipedia.org/wiki/Antenna_(radio), which is incorporated herein by reference.

A monopole antenna is a type of antenna consisting of a straight rod-shaped conductor. A signal from the transmitter is applied, or for receiving antennas the output signal to the receiver is taken, between the lower end of the monopole and a ground plane. One side of the antenna feedline is attached to the lower end of the monopole, and the other side is attached to the ground plane, e.g., the Earth. This contrasts with a dipole antenna which consists of two identical rod conductors, with the signal from the transmitter applied between the two halves of the antenna.

A dipole antenna produces a radiation pattern representative of an elementary electric dipole and commonly consists of two identical conductive elements such as metal wires or rods. A transmitter applies a current between the two halves of the dipole antenna and generates an output signal that, at the receiver, is received between the two halves of the dipole antenna. A feedline to the transmitter or receiver is connected to one of the conductors. So-called "rabbit ears" antennas were commonly used on broadcast television sets. Dipole antennas are electrically equivalent to two monopole antennas mounted end-to-end and fed with opposite phases. See https://en.wikipedia.org/wiki/Dipole_antenna, which is incorporated herein by reference.

The monopole is often used as a resonant antenna. The rod functions as an open resonator for radio waves and oscillates with standing waves of voltage and current along its length.

The length of the antenna, therefore, is determined based on the wavelength of the desired radio waves. The most common form is the quarter-wave monopole, in which the antenna length is approximately one quarter of the wavelength of the radio waves.

Another type of antenna is a collinear antenna, which is an array of dipole or quarter-wave antennas mounted so that the corresponding elements of each antenna are parallel and collinear or colinear, i.e., located along a common axis. Collinear arrays are high gain omnidirectional antennas. Dipole antennas and quarter-wavelength monopole antennas are characterized by an omnidirectional radiation pattern when oriented vertically. Antenna arrangements of this nature radiate equal signal power in all azimuthal directions perpendicular to the antenna. Stacking multiple antennas in a vertical collinear array radiates vertically polarized radio waves and increases the power radiated in horizontal directions and reduces the power radiated in the vertical direction. Doubling the number of stacked idealized lossless antennas would ideally double the gain with an increase of 3.01 dB. See https://en.wikipedia.org/wiki/Collinear_antenna_array, which is incorporated herein by reference.

U.S. Pat. No. 6,771,227 issued Aug. 3, 2004, and entitled Collinear Antenna Structure, incorporated herein by reference, describes an antenna structure comprising " . . . a dipole antenna, a coil, and a set of stacked radiator, wherein the length of the dipole antenna is ½λ, the ground end and the signal end of the dipole antenna are connected to a coaxial cable, the length of the cable line is less than ¼λ, one end of the cable line is connected in series to the top of the signal end, wherein the stacked radiator comprising at least two parallel radiators in series, the length of each radiator is ½λ, the distance between the two radiators is about 1.0 to 4.0 mm, one of the stacked radiator is axially connected in series to the other end of the coil, thus forming the structure of the antenna. This invention provides a collinear antenna structure, the antenna uses the coil to axially connect the signal end of the dipole antenna and the stacked radiator, and let the electromagnetic radiation wave emitted from the signal end of the dipole antenna and the electromagnetic radiation wave emitted from the stacked radiator to propagate toward the same direction thus promoting the radiation gain profit effect. Through a combination of at least two parallel radiators in series and the associated coil, the entire length of the antenna could be effectively reduced, it is also intended that this invention is suitable for the usage of desk electric communication equipment." See Abstract.

The main issue with a standard monopole type antenna is that the VSWR (Voltage Standing Wave Ration) is very narrow and limits the band width. This has been approached by various designs but they typically increase the gain but do nothing for Bandwidth. Most common way to increase the gain, there is a plurality of ¼ or ½ wave antenna elements stacked on top of each other. This will increase the gain proportionally to the number of elements stacked. The issue with this is it reduces your horizontal radiation but increases your vertical radiation. Also, it dramatically changes the height of the antenna making it longer and more cumbersome. Since RF is measured in dBi which is logarithmic for every increase in 3 dBi there is actually a doubling of power output, which means longer transmission distance. Another area that is needed is affordable industrial antennas that can be mounted outdoors or in aggressive industrial environments such as refineries and chemical plants.

SUMMARY OF THE INVENTION

The present invention is directed to addressing the shortcomings of antennas discussed above and particularly addresses the following three main issues with standard monopole antennas, Height, Bandwidth, and Gain. The main principle of this antenna is a concept that is a combination of multiple technologies. The antenna has three main features. A folded ½ wave top element that is basically two ½ wave elements in parallel above a ⅕th wave coil isolator another ¼ wave element that is on top of another ¼ wave element that is shielded by a brass feed tube and the bottom element is insulated with a PTFE tube. This is all stacked on top of an RF 50-ohm fitting (Typically an "N" female).

In a first implementation the present invention provides.

The first implementation may be further characterized in one or more of the following manners: wherein.

In a second implementation, the present invention provides.

The second implementation may be further characterized in one or more of the following manners: wherein.

BRIEF DESCRIPTION OF THE DRAWINGS

To facilitate a full understanding of the present invention, reference is now made to the accompanying drawings, in which like elements are referenced with like numerals. These drawings should not be construed as limiting the present invention but rather are intended to be exemplary and for reference in explaining operation of the present invention.

FIG. 13 illustrates an exemplary PTFE Antenna Insulation Tubing configuration associated with the FCD of FIG. 2A/3A.

FIG. 15-19 illustrate exemplary configurations of the FCD of FIG. 2A/3A.

FIG. 20 illustrates an exemplary configuration of the FCD antenna of FIG. 3A variation of FCD antenna 2A.

DETAILED DESCRIPTION

The present invention will now be described in more detail with reference to exemplary embodiments as shown in the accompanying drawings. While the present invention is described herein with reference to the exemplary embodiments, it should be understood that the present invention is not limited to such exemplary embodiments. Also, while the exemplary embodiments describe use of exemplary discrete component configurations, this is not necessarily limiting to the invention and one possessing ordinary skill in the art would understand the invention may be used in connection with other configurations of discrete components having ratings effective in connection with the processes described in detail hereinbelow. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
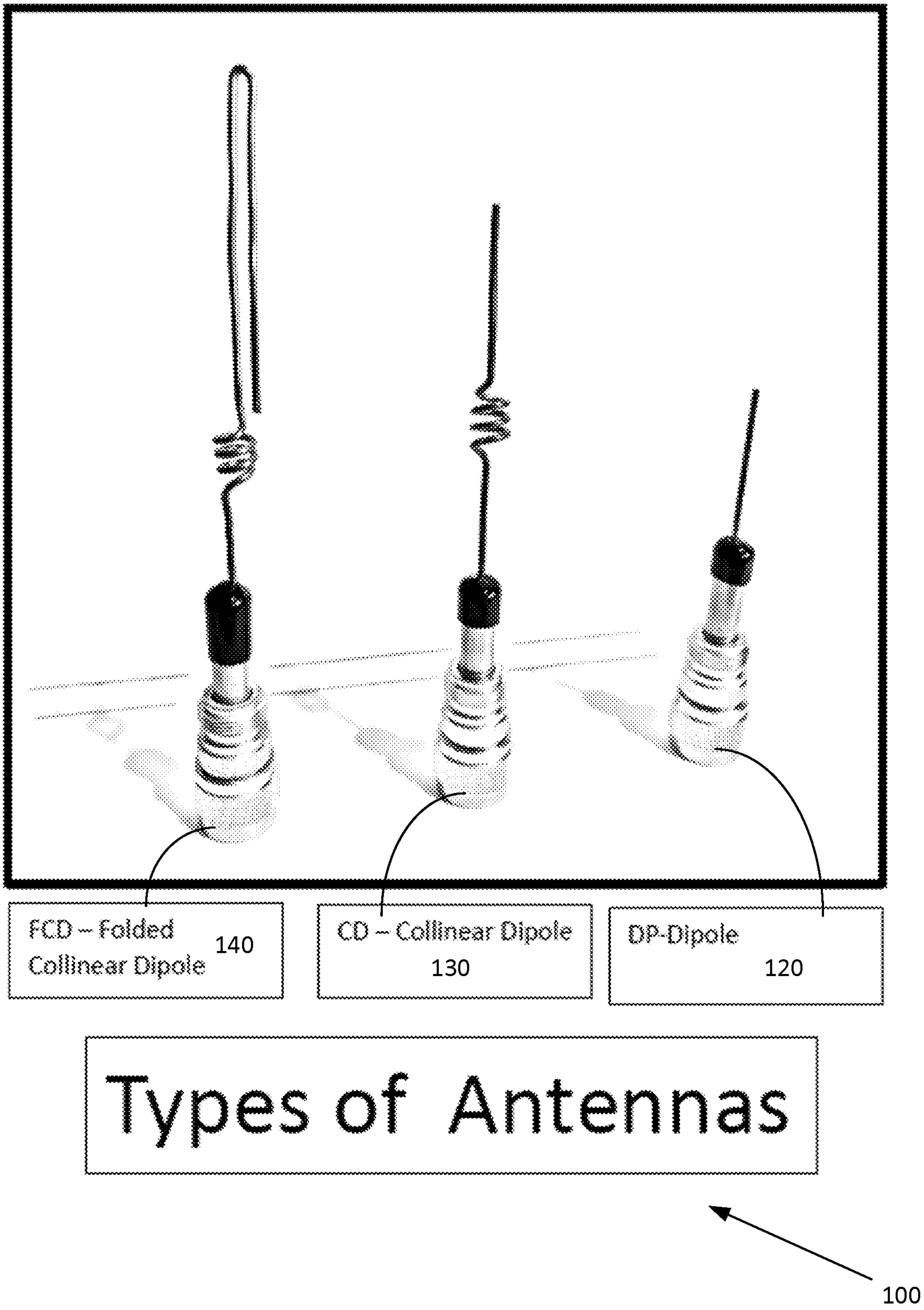
FIG. 1 provides a view of three types of antennas used in radio transmission—FCD—Folded Collinear Dipole, CD—Collinear Dipole, and DP Dipole.

FIG. 1 provides a view of three types of antennas 100 used in radio transmission, including FCD-Folded Collinear Dipole 140, CD-Collinear Dipole 130, and DP Dipole Antenna 120.

Figure 2A:
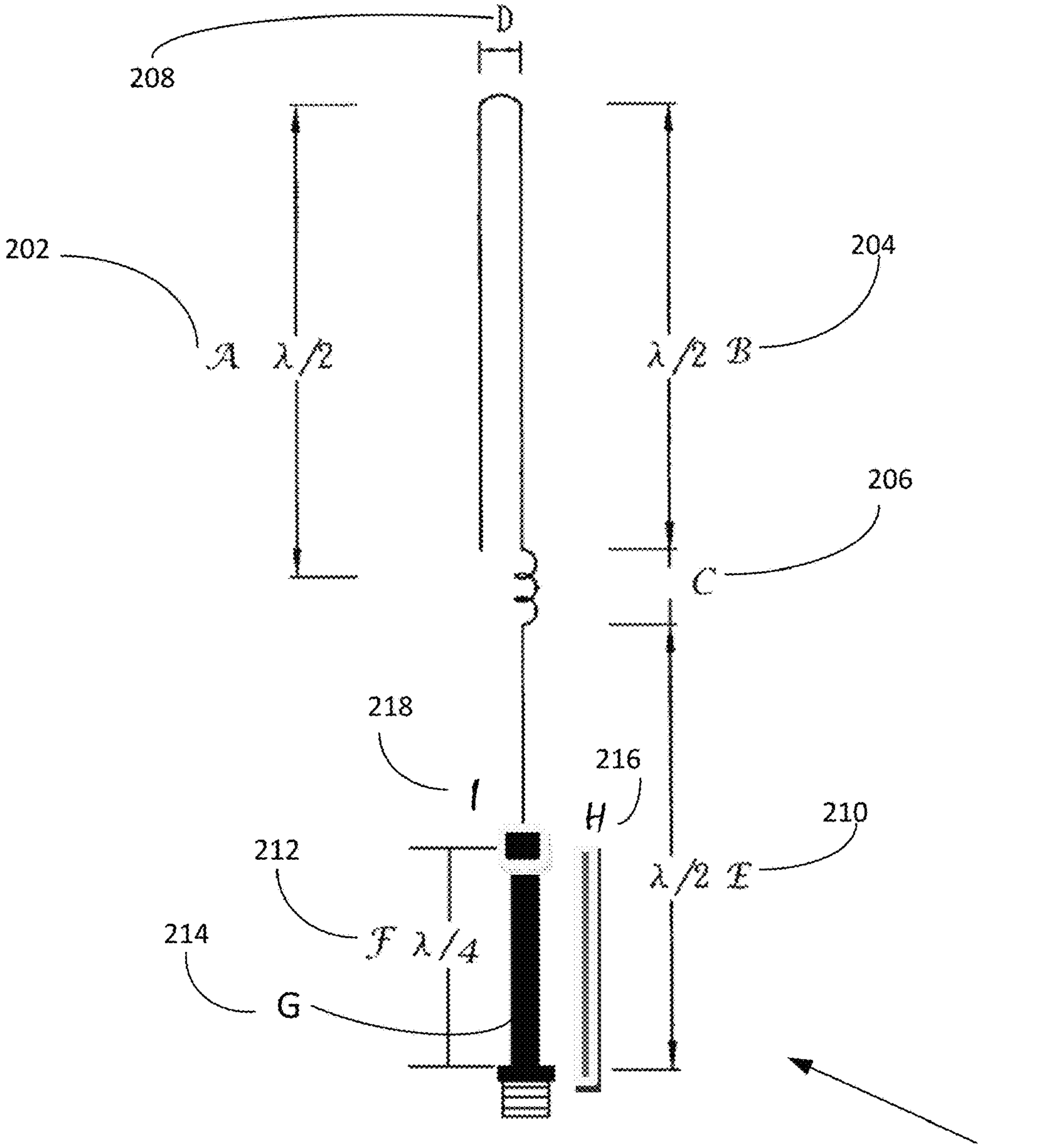
FIG. 2A provides a schematic view of a FCD—Folded Collinear Dipole Antenna.

FIG. 2A provides a schematic view of a FCD-Folded Collinear Dipole Antenna 200.

Element A 202 shows the first element height based on ½ wave of the frequency wave calculated wavelength. Element B 204 illustrates the folded element that runs parallel to the first element Figure A. Element C 206 shows the loading coil that is calculated at ⅕th of the wavelength. The diameter of the coil using 14 AWG is 1⁄20th of the wavelength. Using a geometrical calculation by taking the wavelength ⅕th od the wave and the coil diameter the calculated number of coils can be calculated.

Element D 208 shows the separation distance of the two ½ wave folded elements. This is approximately 1⁄40th of the wavelength. But this is not as critical as other dimensions as it can vary as much as ±20% in width. Element E 210 is the bottom element that is ½ wavelength long and is mounted through the bottom tube amplifier assembly F. Element F 212 is the feed tube shield and band width amplifier, this works in conjunction of the folded element design. This tube is ¼ of a wavelength and is pressed into the RF fitting and the throat of the fitting length must be included in the total ¼ wavelength dimensions. This protects the internal feed insulator H 216. Element G 214 is a protective sleeve encasing the antenna elements assembly this is very critical when it comes to materials, most commonly used is a form of ABS plastic which has some attenuation affects on the RF signal. This assembly uses a new developed polymer called "cross-linked polyethylene" This is nearly invisible to the RF signal and in turn does not attenuate the signal. Element H 216 is the PTFE (Polytetrafluoroethylene) insulating tube assembly that is keeping the signal from radiating off the antenna, and keeps the feed through of the signal directly to the element radiators. This design is critical to be matched to the 50-ohm source to maintain the best possible VSWR. Also, PTFE has a RF reflective index of 1.4, so perfect is 1 and this would be as compared to air. So, for insulating an RF signal feed to a radiating element the closer to RF index of 1 the better it will perform. Element I illustrates vinyl cap assemblies although different in size they are there for protection, the smaller one mounted on F also keeps the element centered into the feed tube assembly.

Figure 2B:
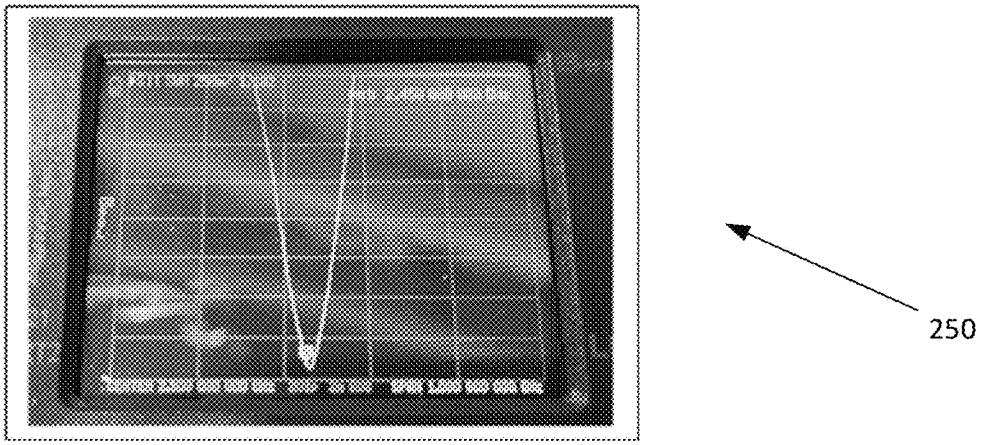
FIG. 2B shows a resulting waveform associated with a common FCD and shows a typical VSWR of a standard Collinear antenna, the signal match and bandwidth are very narrow.

FIG. 2B shows a resulting waveform associated with the FCD of FIG. 2A and shows a typical VSWR of a standard Collinear antenna; the signal match and bandwidth are very narrow as shown in the waveform 250.

Figure 3A:
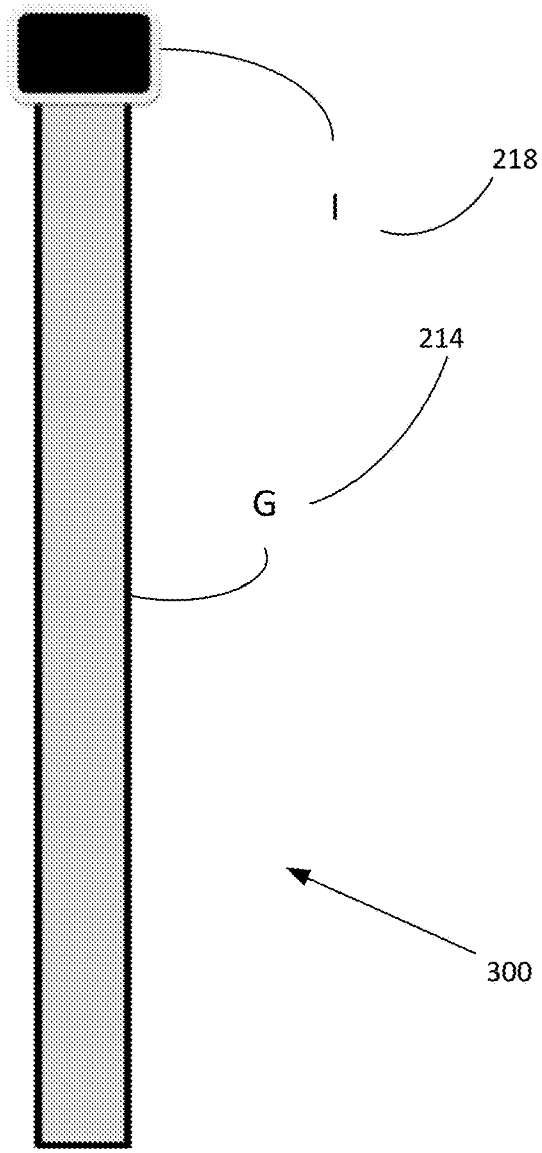
FIG. 3A provides a schematic of a FCD-Folded Collinear Dipole antenna of FIG. 2A in accordance with a first embodiment of the present invention.

FIG. 3A provides a schematic of a FCD-Folded Collinear Dipole antenna 300 in accordance with a first embodiment of the present invention.

The exemplary antenna assembly 2A/3A is made from pure half hard or annealed copper wire 14 AWG but lighter gauge will also work as well, but will reduce the bandwidth. The element is formed from 1 piece but could be made in sections, but preference is one continuous element. The element is comprised of 4 main sections, this includes the two, top folded ½ wave radiators that are bent parallel to one another and separated by 1/40th of a wavelength bend. Next is the isolation coil that is ⅕th of a wavelength in straight material but then coiled to 1/20th of a wavelength diameter. Then based on a simple geometric calculation the number of coils is calculated by (⅕th wavelength)/(π×Diameter of 1/20th wavelength) then reduced by spacing of the coils. An example for 2.4 GHz would be 2.10/(3.14×0.125)=5.3 now the coils need to be space 1.51 (fixed number based on performance testing) so final results is 3.80 number of coils. This is calculated using 14 AWG wire. Any other wire gauge would have to be tested and the new fixed number would have to be tested for.

The insulator tube assembly as shown in figures F, H and I has multiple purposes. The feed tube F is a 6 mm brass tube that has a 0.25 to 0.5 mm wall thickness. 0.25 is preferred, but 0.5 mm will work but may need to be 1 mm shorter that the ¼ wavelength dimensions. This will act as a booster, shield and ground plane as required in a dipole configuration. The internal "H" insulation is PTFE (Polytetrafluoroethylene) is performing two major functions. It keeps the reflection of the signal to a minimum (reflection of an RF signal reduces gain and performance). This also keeps the signal from coupling up to the feed element brass tube ground plane which would short the signal out.

The cover/protection tube "G" is made from "cross-linked polyethylene" tubing. This material is part of the increased performance design of this antenna it is nearly invisible to the RF signal and does not attenuate the signal which would reduce overall performance found today in most sleeved monopole antennas. The Vinyl cap protectors are used for mainly two functions, on the main larger sleeve it keeps out any atmospheric conditions including intruders such as insects. The feed tube cap 218 insulates and keeps the element centered into the feed tube assembly.

Figure 3B:
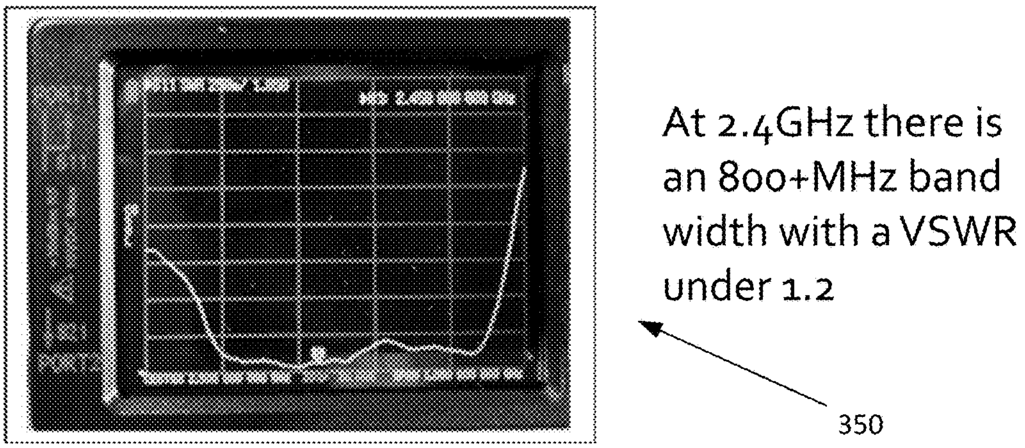
FIG. 3B shows a resulting waveform associated with the FCD of FIG. 2A/3A and shows a the VSWR of the invention, the Folded Colinear Dipole antenna. The match to frequency (bandwidth) is much greater—over 500% greater than a conventional collinear coaxial feed standard antenna design such as that of U.S. Pat. No. 6,771,227.

FIG. 3B shows a resulting waveform 350 associated with the FCD of FIG. 3A and shows a the VSWR of the invention, the Folded Colinear Dipole antenna. The match to frequency (bandwidth) is much greater-over 500% greater than a conventional collinear coaxial feed standard antenna design such as that of U.S. Pat. No. 6,771,227.

Figure 4A:
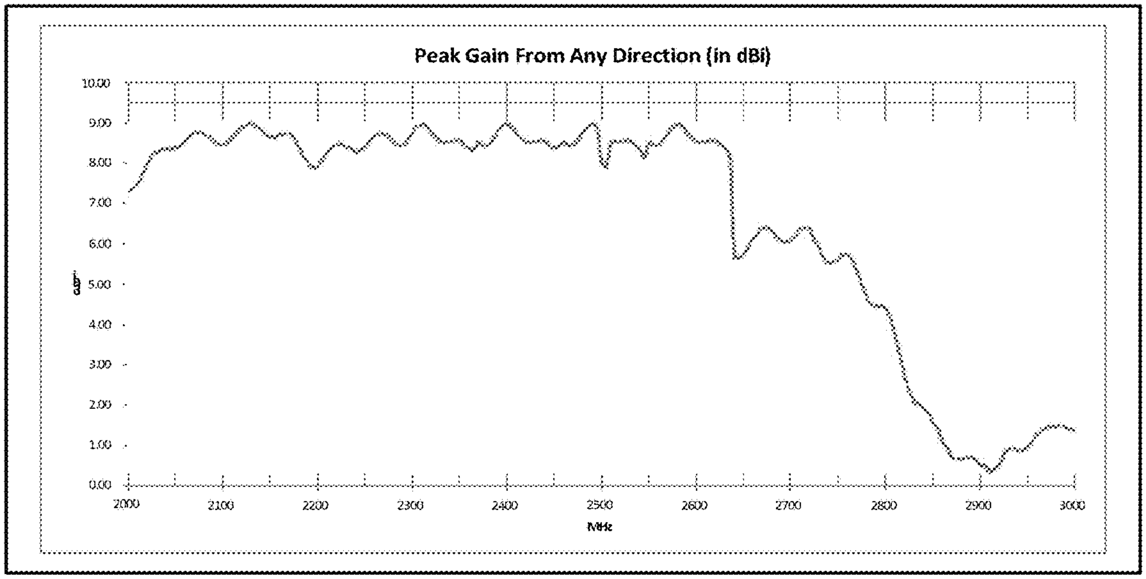
FIG. 4A illustrates a Gain chart of the FCD antenna of FIG. 2A/3A and shows the amount of gain as tested across the usable bandwidth, which is 500% greater improvement over present technology in accordance a first embodiment of the present invention.

FIG. 4A illustrates a Gain chart 400 of the FCD antenna of FIG. 2A/3A and shows the amount of gain as tested across the usable bandwidth, which is 500% greater improvement over present technology in accordance a first embodiment of the present invention.

Figure 4B:
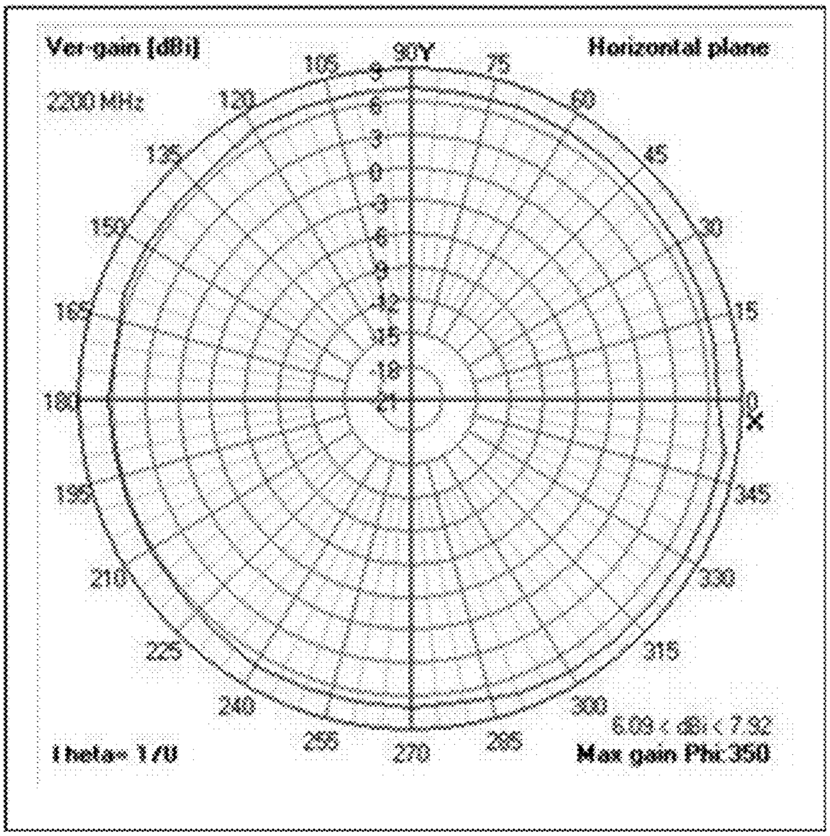
FIG. 4B illustrates the Horizontal gain pattern associated with the FCD of FIG. 2A/3A as tested and shows an even uniform horizontal projection in all directions (360 Degrees) with a constant gain.

FIG. 4B illustrates the Horizontal gain pattern 410 associated with the FCD of FIG. 2A/3A as tested and shows an even uniform horizontal projection in all directions (360 Degrees) with a constant gain.

Figure 4C:
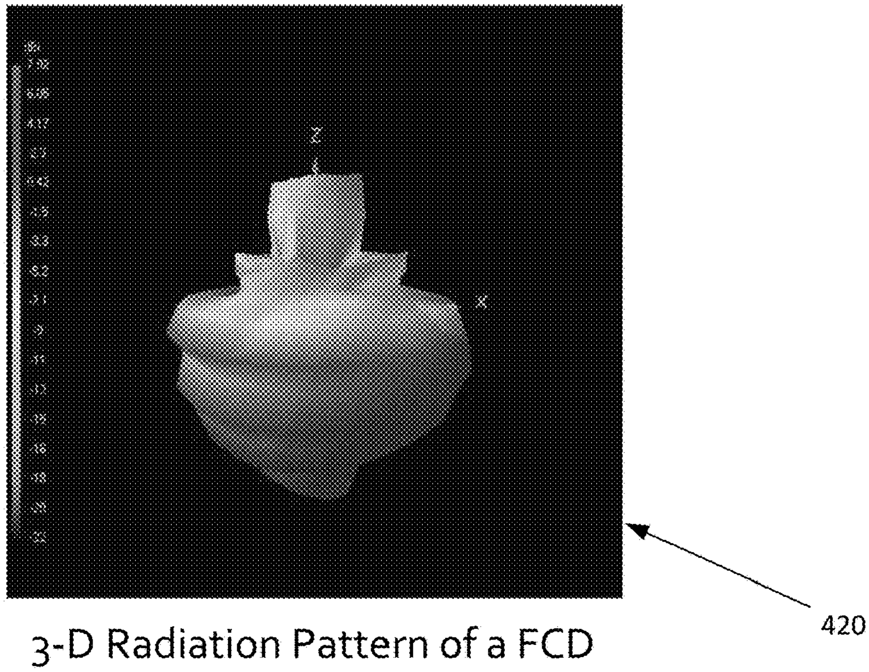
FIG. 4C illustrates a three-dimensional radiation pattern associated with the FCD of FIG. 2A/3A.

FIG. 4C illustrates a three-dimensional radiation pattern 420 associated with the FCD of FIG. 2A/3A.

Figure 4D:
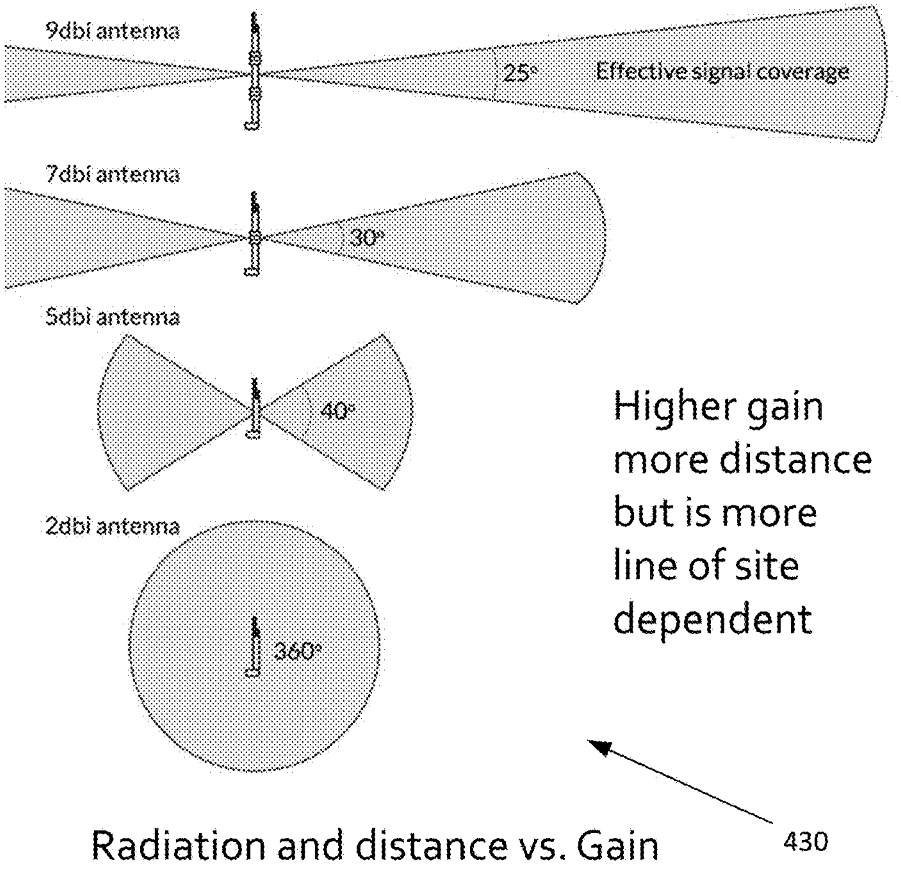
FIG. 4D illustrates a radiation and distance gain pattern associated with the FCD of FIG. 2A/3A.

FIG. 4D illustrates a radiation and distance gain pattern 430 associated with the FCD of FIG. 2A/3A. In this illustration it is clear that higher gain results in greater distance but the signal becomes more line of site dependent.

Figure 4E:
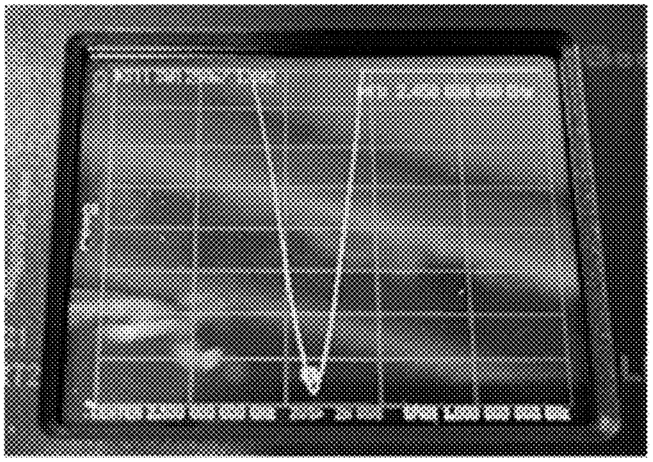
FIG. 4E illustrates a comparison of Dipole antenna vs. FCD (FIG. 2A/3A) antenna bandwidth response.
Figure 4E:
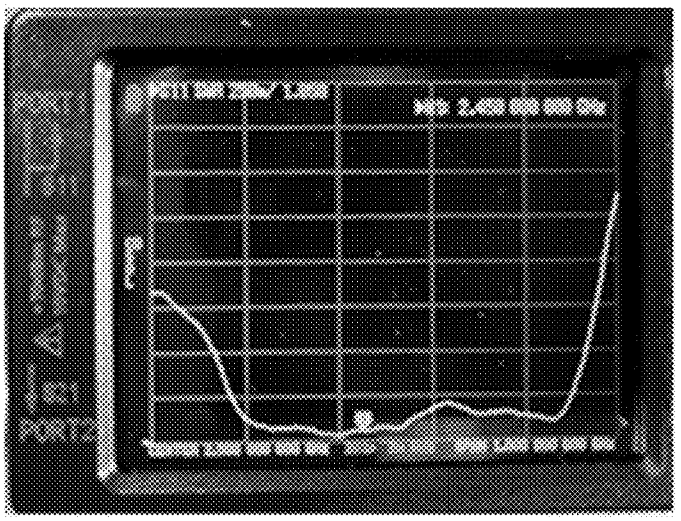

FIG. 4E illustrates a comparison 440 of Dipole antenna vs. FCD (FIG. 2A/3A) antenna bandwidth response. Here, the standard dipole antenna has a very narrow bandwidth 440 so in frequency hopping you will get much less efficiency as compared to the FCD shown at 450.

Figure 4F:
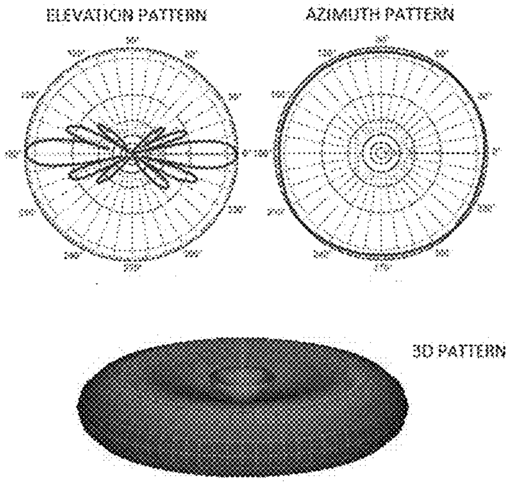
FIGS. 4F and 4G illustrate a comparison of Dipole antenna vs. FCD (FIG. 3A) antenna radiation pattern.
Figure 4G:
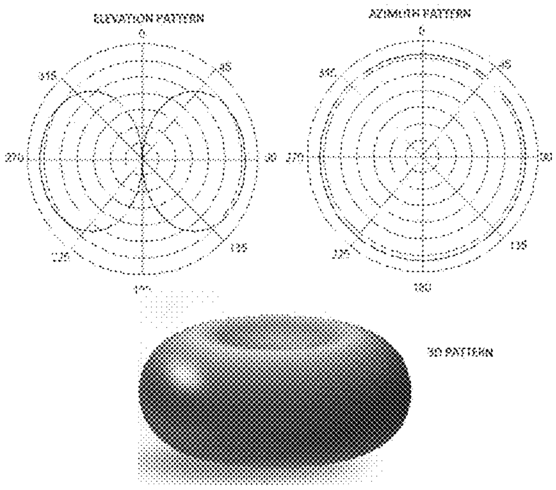

FIGS. 4F and 4G illustrate a comparison of Dipole antenna 470 vs. FCD 460 (FIG. 2A/3A) antenna radiation pattern.

Figure 4H:
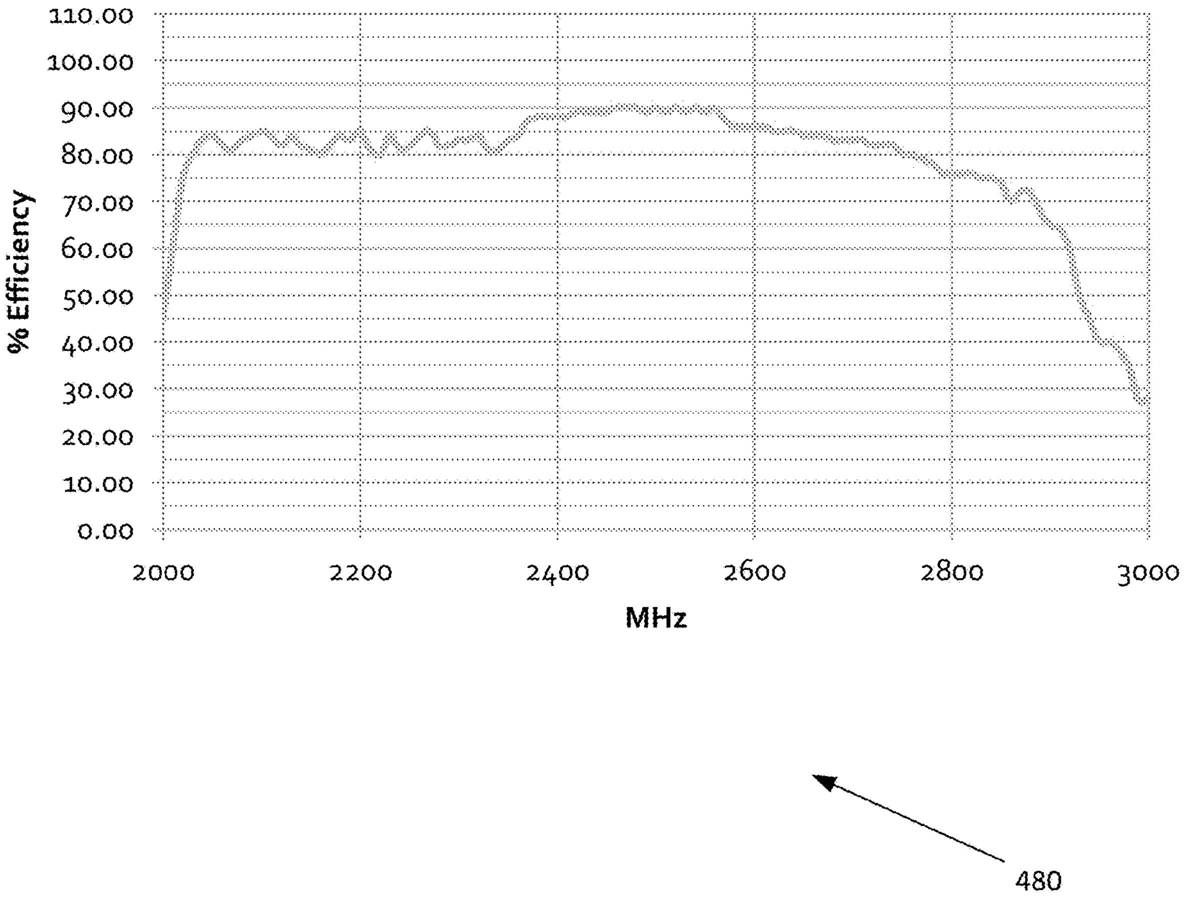
FIG. 4H illustrates an efficiency vs frequency response measured at 100 meters associated with the FCD of FIG. 2A/3A.

FIG. 4H illustrates an efficiency vs frequency response 480 measured at 100 meters associated with the FCD of FIG. 2A/3A.

Figure 5:
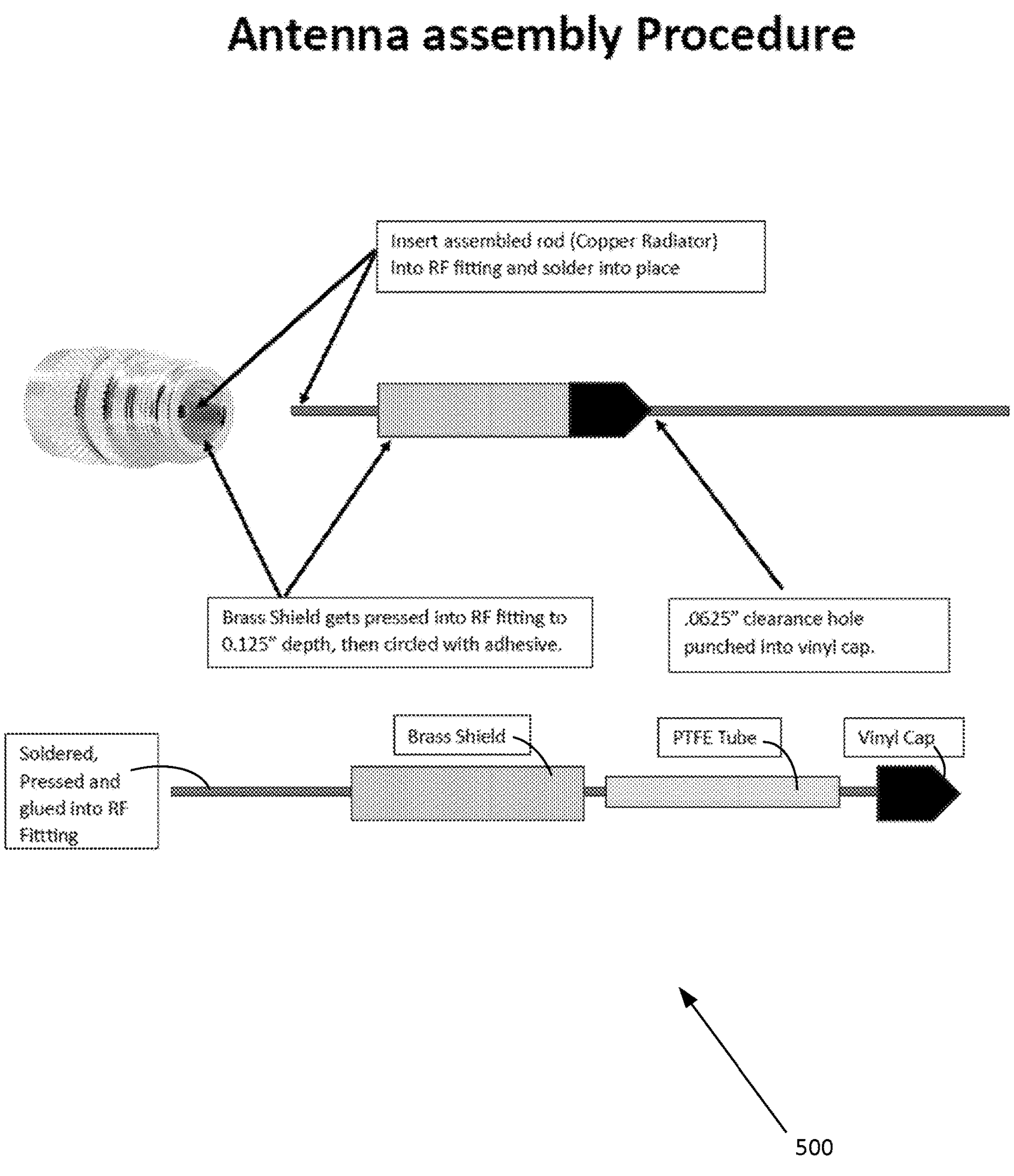
FIG. 5 illustrates an Antenna Assembly Procedure associated with the FCD antenna of FIG. 2A/3A.

FIG. 5 illustrates an Antenna Assembly Procedure 500 associated with the FCD antenna of FIG. 2A/3A. Here a brass shield and PTFE tube, in collinear fashion are pressed soldered and glued about a rod (copper radiator) with a vinyl cap fitted thereon to form a rod assembly. The assembled rod (copper radiator) is inserted into RF fitting and soldered into place. A brass shield is pressed into the RF fitting to 0.125 inch depth, for example, and then circled with adhesive. A 0.0625-inch clearance hole is punched into the vinyl cap.

Figure 6:
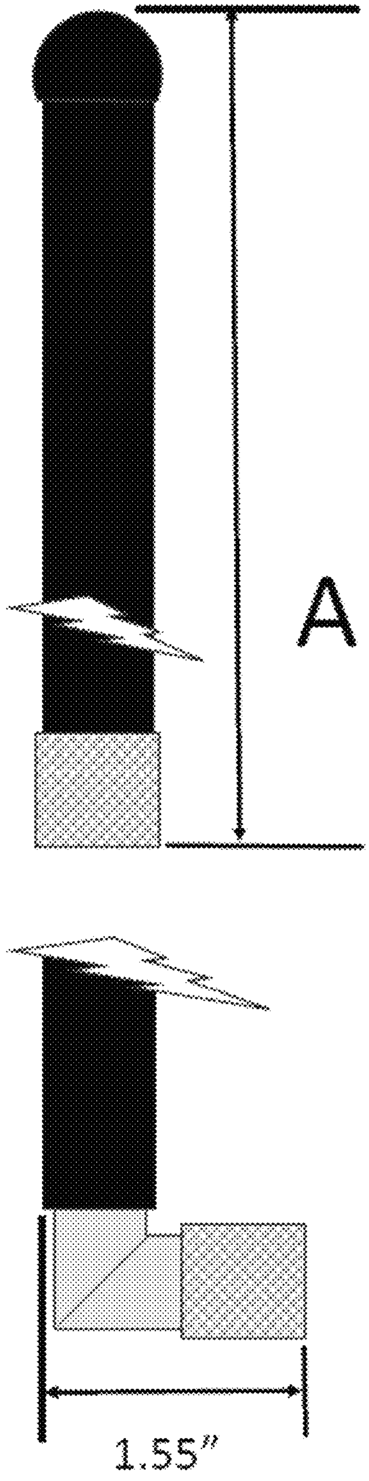
FIGS. 6 and 7 illustrate exemplary antenna lengths for straight and angled variations of the FCD of FIG. 2A/3A.
Figure 7:
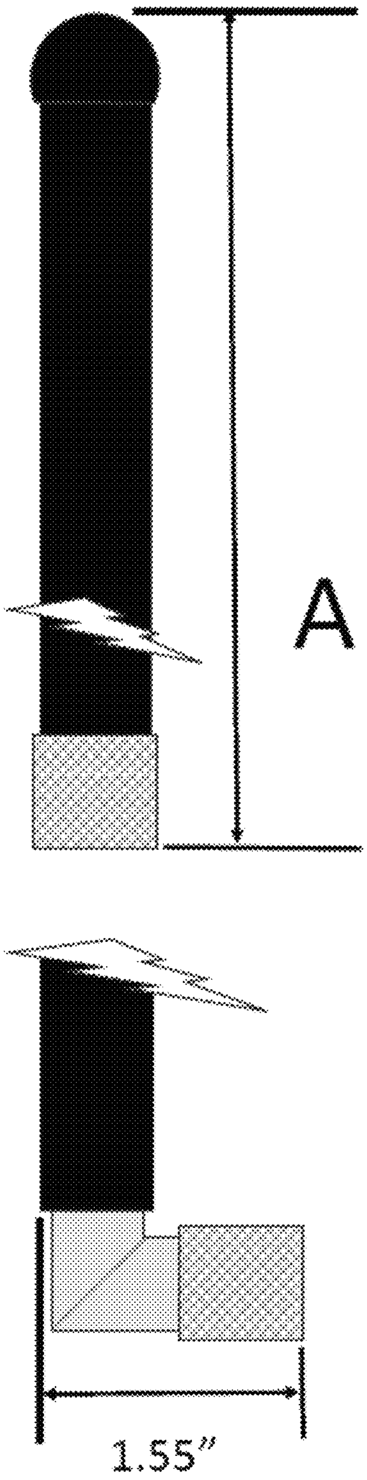

FIGS. 6 and 7 illustrate exemplary antenna lengths for straight and angled variations of the FCD of FIG. 2A/3A.

Figure 8:
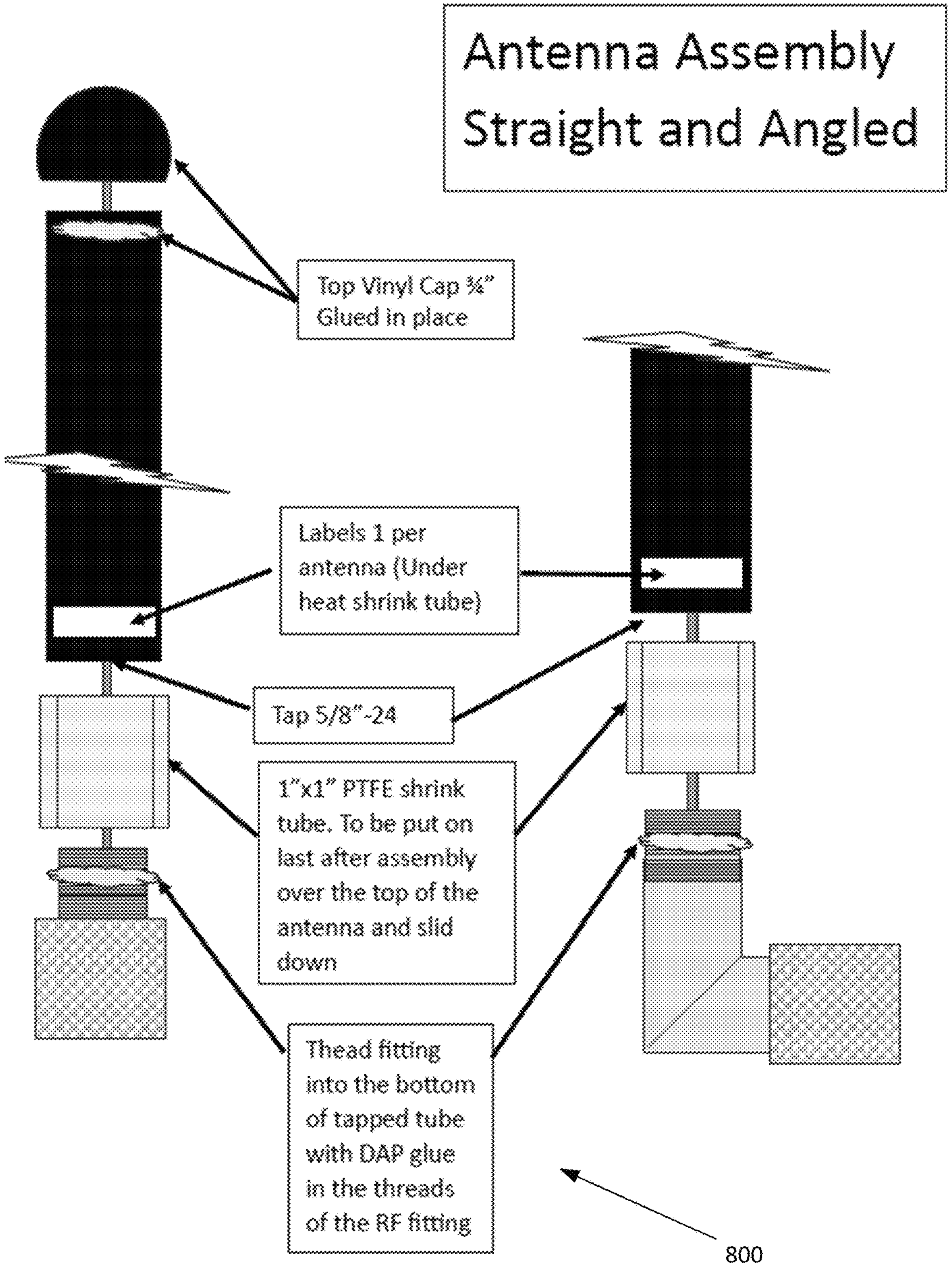
FIGS. 8 and 9 illustrates antenna assembly steps for straight and angled variations of the FCD of FIG. 2A/3A.
Figure 9:
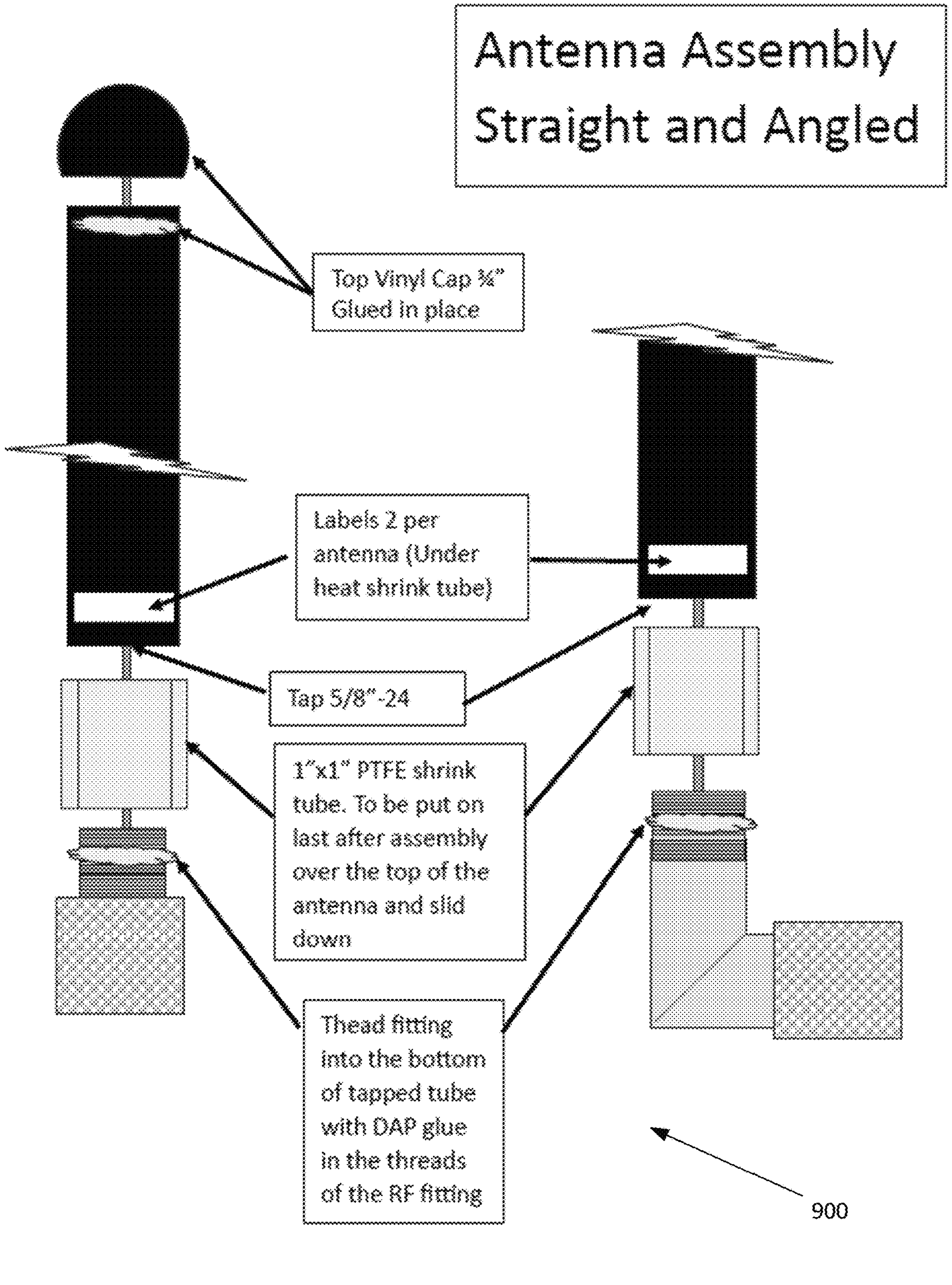

FIGS. 8 and 9 illustrates antenna assembly steps for straight and angled variations of the FCD of FIG. 2A/3A.

Figure 10:
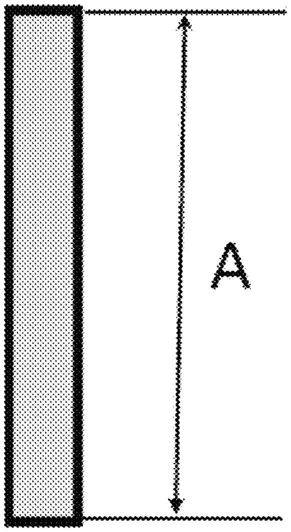
FIG. 10 illustrates an exemplary Brass antenna shield configuration associated with the FCD of FIG. 2A/3A.

FIG. 10 illustrates an exemplary Brass antenna shield configuration associated with the FCD of FIG. 2A/3A.

Figure 11:
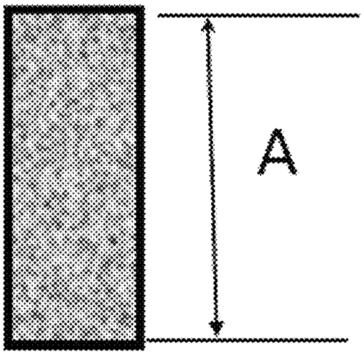
FIG. 11 illustrates an exemplary Large Cell Foam Insulation Tubing configuration associated with the FCD of FIG. 2A/3A.
Figure 11:

FIG. 11 illustrates an exemplary Large Cell Foam Insulation Tubing configuration associated with the FCD of FIG. 2A/3A.

Figure 12:
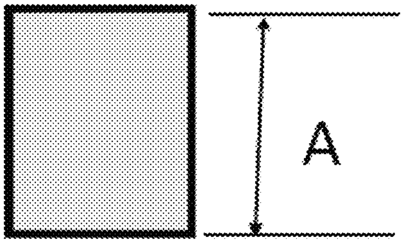
FIG. 12 illustrates an exemplary PTFE Heat Seal configuration associated with the FCD of FIG. 2A/3A.

FIG. 12 illustrates an exemplary PTFE Heat Seal configuration associated with the FCD of FIG. 2A/3A.

FIG. 13 illustrates an exemplary PTFE Antenna Insulation Tubing configuration associated with the FCD of FIG. 2A/3A.

Figure 14:
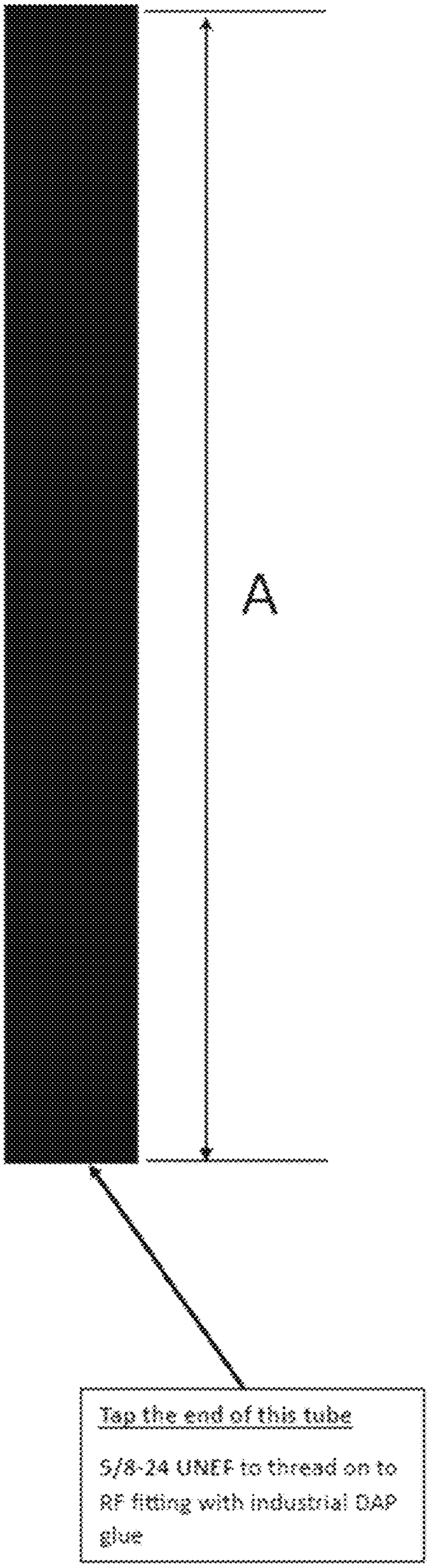
FIG. 14 illustrates an exemplary Antenna Sheath Tubing Length configuration associated with the FCD of FIG. 2A/3A.

FIG. 14 illustrates an exemplary Antenna Sheath Tubing Length configuration associated with the FCD of FIG. 2A/3A FIG. 15-19 illustrate exemplary configurations of the FCD of FIG. 2A/3A.

FIG. 20 illustrates an exemplary configuration of the FCD antenna of FIG. 3A variation of FCD antenna 2A.

One key advantage of the present invention is that it eliminates the need for a coaxial feed associated with prior art FCDs and uses a brass feed tube amplifier assembly to provide an increase in performance and gain.

The FCD of the present invention also increases the bandwidth significantly. There is an increase of over 500% over a normal monopole design antenna. The combination of the feed tube design, the folded parallel ½ wave elements and the isolation coil increases the gain to over 9 dBi this is 300% better than the standard dipole antenna. This design reduces the height of the antenna by ⅓ the height of the equivalent colinear antenna that would have a gain of 9 dBi. The "cross-linked polyethylene" outer tube sheath material is invisible to RF radiation and does not reduce the signal performance or cause attenuation. The antenna assembly is built directly into an RF fitting, with no coaxial feeder, this reduces loss and helps to increase performance. The heavier gauge wire (14 AWG) also increases the wattage capabilities of the antenna and assist in increasing the band width. The increased bandwidth eliminates the need for multiple antennas to cover a wider range of frequencies. Such as 5.4 and 5.8 GHz or 868 and 914 MHz. These would require either a complex dual range antenna or 2 antennas. Due to the wider band width of the FCDP only one antenna is required. The simpler design of this antenna and wider bandwidth reduces the cost of manufacturing and installation. The design of this antenna and the materials used for the FCDP, make it more suitable to industrial applications such as petrochemical plants and many other process and industrial applications. This also makes it more suitable for outdoors weather applications. By eliminating the coaxial internal feedline this reduces the velocity factor to almost a perfect "1.0" this means less reflection and attenuation. A slower signal affected by the wire size and insulation of a coaxial line directly affects the wavelength calculation. By developing a working algorithm program it is easy to reproduce this design in any RF frequency band. The feed tube assembly with PTFE insulator, and the "Air Gap" between the insulating PTFE and the brass Ground tube gets the Reflective index to nearly a perfect 1.0 and also a near perfect velocity factor (how close it allows the signal to approach the speed of light). This FCDP design has an increased gain, typical is 9 dBi, where a standard Dipole is approximately 3 dBi, and a colinear is typically 5 dBi. The FCDP has a substantial increase in gain without sacrificing size.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

The invention claimed is:

1. A Folded Collinear Dipole (FCD) Antenna comprising:

first and second folded radiator elements having a length λ/2 corresponding to ½ wave of the frequency wave calculated wavelength and being separated along their parallel lengths by a distance D being approximately λ/40;

a third radiator element having a length λ/2 having a lower portion and terminating at a lower end;

a loading coil isolator having a length λ/5 that is coiled to define a set of coil turns with a diameter of λ/20 and being connected to one of the first and second folded radiator elements at a coil first end and connected to the third element at the opposite coil second end, thereby interconnecting the first and second folded radiator elements with the third radiator element;

a bottom tube amplifier assembly configured to receive and support a lower portion of the third radiator element, the bottom tube amplifier assembly having a length λ/4 and comprising;

an internal insulating sleeve made of Polytetrafluoroethylene (PTFE) having an RF reflective index of approximately 1.4;

a brass ground tube shield configured to receive the internal insulating sleeve with an air gap formed between the brass ground tube shield and the internal insulating sleeve enhancing the signal velocity factor;

an outer protective sleeve encasing the lower portion of the third radiator element, the internal insulating sleeve and the brass shield, and comprising environmentally stable and RF invisible material cross-linked polyethylene that is operationally invisible to the RF signal and avoids attenuating the RF signal;

an RF fitting having a throat length and configured to receive the end of the third radiator element and wherein an end of the brass ground tube shield is securely affixed to a receiving portion of the RF fitting; and a tube seal cap disposed at the top of the bottom tube amplifier assembly opposite the RF fitting and defining an opening through which the lower portion of the third radiator element passes;

wherein the bottom tube amplifier assembly is secured to the RF fitting and the throat length of the RF fitting is included in the overall length λ/4 of the bottom tube amplifier assembly.

2. The FCD Antenna of claim 1 wherein the transmission line, antenna load and source have matching 50-ohm impedance and the VSWR is less than 1.5, and wherein the antenna has a load impedance matched to a source impedance to achieve a desired Voltage Standing Wave Ratio (VSWR) and a low Q value with insulation velocity factor greater than 0.9.

3. The FCD Antenna of claim 1 wherein the first and second radiator elements are made of 14 AWG copper.

4. The FCD Antenna of claim 1 wherein the brass ground tube shield is pressed, soldered and glued into the RF fitting.

5. The FCD Antenna of claim 1 wherein the tube seal cap opening is centered to promote the third radiator element being centered relative to the internal insulator sleeve.

* * * * *